F. A. BRACKETT.
CEMENTING MACHINE.
APPLICATION FILED JULY 29, 1910.
1,192,380.
Patented July 25, 1916.
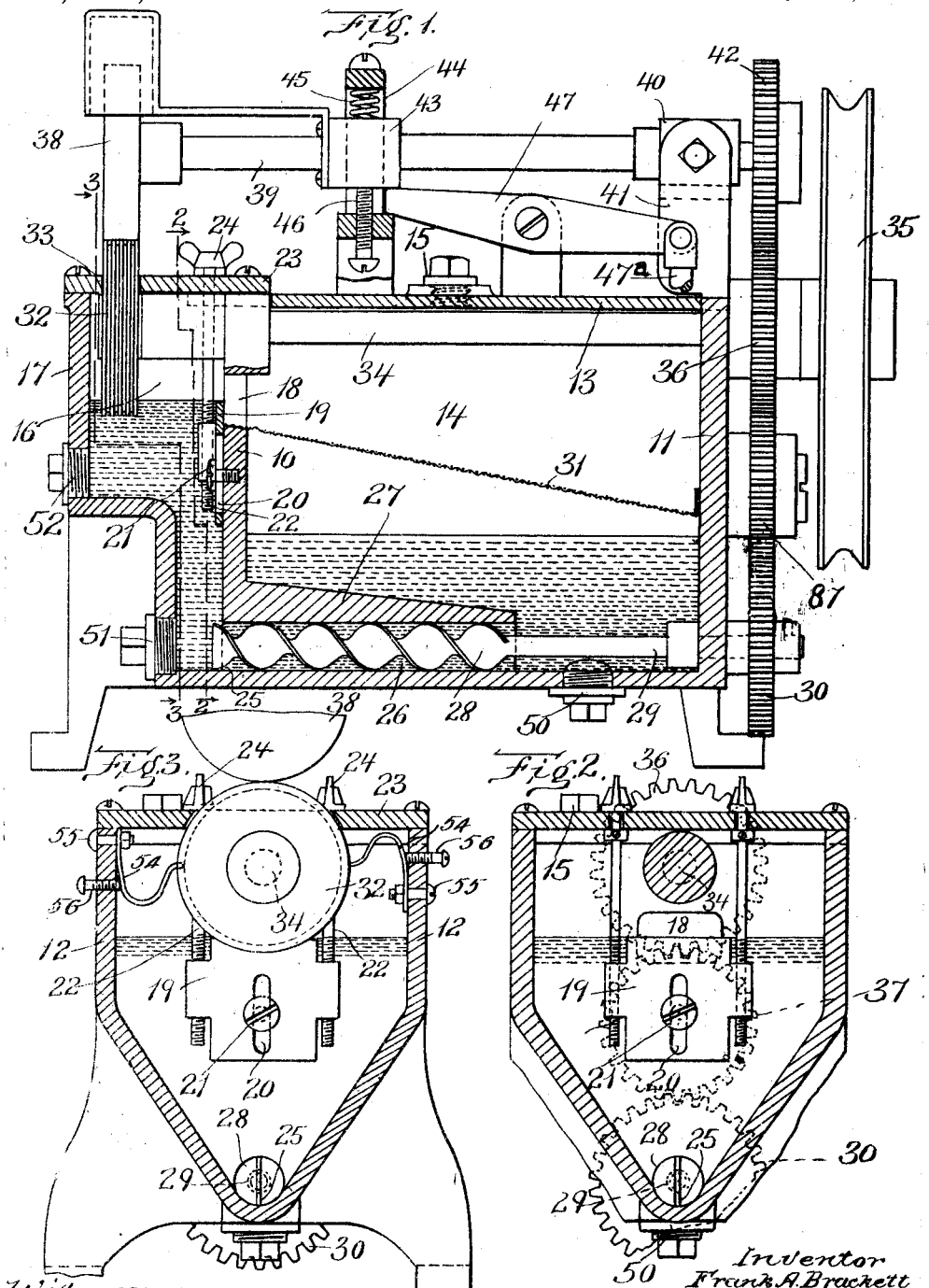
Witnesses:
H. L. Allen
A. [illegible]
Inventor
Frank A. Brackett
by Wright Brown Quinby May
Attys.

UNITED STATES PATENT OFFICE.

FRANK A. BRACKETT, OF BINGHAMTON, NEW YORK, ASSIGNOR OF ONE-HALF TO FREL L. EMERSON, OF BINGHAMTON, NEW YORK.

CEMENTING-MACHINE.

1,192,380. Specification of Letters Patent. Patented July 25, 1916.

Application filed July 29, 1910. Serial No. 574,496.

*To all whom it may concern:*

Be it known that I, FRANK A. BRACKETT, of Binghamton, in the county of Broome and State of New York, have invented certain new and useful Improvements in Cementing-Machines, of which the following is a specification.

This invention has relation to cementing machines of the general character of the one set forth in my application Serial No. 539,195, filed January 20, 1910, and it has for its object to provide certain improvements therein with respect to the instrumentalities for supplying cement to the roll or other device which applies such cement to the work. Such machines are largely employed in applying the cement to leather or other material in the manufacture of shoes and other various articles of manufacture, wherein it is necessary that the cement should be applied evenly upon the surface of the work. Cements are of varying consistency, some of them being thick and viscid, and moreover usually contain more or less volatile matter.

The present invention provides means for maintaining the cement at a predetermined level in a tank or chamber and also in a predetermined relation to the applying device which removes the cement from the chamber and effects its application upon the surface of the work.

According to the present invention, I employ what I term a reservoir or external source of supply, and a tank or chamber in which the level of the cement is in a horizontal plane above that of the level of cement in the reservoir or source of supply. The height of the column of cement in the tank or chamber is regulated by a discharge port or outlet through which the liquid cement may flow back into the reservoir. Between the tank and the reservoir is an inlet conduit through which the cement is supplied from the reservoir to the tank by means of a suitable pump or conveyer which is operated to supply cement to the tank or chamber in greater volume than is demanded by the needs of the applying roll, the surplus passing through the discharge port back into the reservoir, so that a constant circulation of the cement in the tank or chamber is maintained. By maintaining the constant circulation of cement through the chamber, I am able to prevent thickening of the cement therein due to the evaporation of the volatile constituents thereof which is bound to take place on account of the aperture in the cover of the chamber through which the applying roll or device extends to apply the cement to the work. The discharge port is provided with a gate or dam which is adjustable vertically to vary the height or level of the cement in the tank or chamber.

Referring to the accompanying drawings, Figure 1 represents a longitudinal section through a machine embodying my invention. Fig. 2 represents a section on the line 2—2 of Fig. 1. Fig. 3 represents a section on the line 3—3 of Fig. 1.

The invention is capable of a variety of embodiments, but I have illustrated a simple form of machine which is the best now known to me. The base of the machine consists of a casing, the body of which is substantially box-like in form so as to provide a reservoir or source of cement external to the chamber. The said chamber is provided with end walls 10 and 11, and side walls 12, 12. The lower portions of the side walls converge, as shown in Figs. 2 and 3, to provide a trough-like formation so that the cement may be entirely removed therefrom, as will be explained. The top of the reservoir is closed by a cover or plate 13 so that the interior of the reservoir 14 may be sealed against the admission of the atmosphere and the escape of the volatile matter in the reservoir. The cover or plate is provided with an opening through which the cement may be poured into the reservoir, such opening being closed by a screw cap 15. The end wall 10 of the reservoir is a partition which extends transversely across the casing to separate the reservoir from the tank or chamber 16, the outer end of said tank being formed by the wall 17 which is a portion of the casing. In the partition wall is a discharge outlet 18 through which the cement may flow from the chamber or tank 16 into the reservoir.

19 indicates a dam or gate having a slot 20 through which a screw 21 passes into the wall 10 to attach it thereto. This gate or dam controls the height of the column of cement in the tank, as will be readily understood. Means, accessible exteriorly of the tank, are employed for adjusting the dam, any convenient means for this purpose being utilized. As illustrated, the adjusting means comprises two screw bars 22, 22 having a threaded engagement with lugs on the dam, the upper ends of said screw bars passing through and being journaled in the cover plate 23 for the tank and being provided with winged heads 24 by which said screw bars may be rotated. The inlet to the tank is indicated at 25 and it constitutes as it were the mouth of a horizontal cylindrical inlet duct 26, said duct being formed by the bottom of the reservoir and by a housing 27, the upper surface of which is downwardly inclined as shown in Fig. 1. In said duct is a rotary pump which consists of a bladed conveyer 28, the vanes or blades of which fit approximately tightly the cylindrical walls of the duct. Said vanes are formed on or secured to a shaft 29 whose end is journaled in the end wall 11 and is equipped with a driving gear 30. The conveyer or pump is driven at such speed as to supply to the tank in a constant unvarying stream more cement than is required by the applying roll which will be described, so that the over-flow from the tank flows by gravity back into the reservoir, the height of the column of cement in the reservoir being always less than the height of the column in the tank. In other words, the level of the cement in the tank is always higher than the level of cement in the reservoir so that there will be a constant out-flow through the discharge duct 18 into the reservoir when the machine is in operation.

31 indicates a screen in the reservoir which is preferably downwardly inclined from the discharge outlet. The cement from the tank or chamber 16 is screened as it flows by gravity down to the bottom of the reservoir, the chips or screenings collecting on the screen at its lowermost part.

Any convenient mechanism for applying the cement in the tank to the work may be utilized. I have illustrated the same mechanism which is shown, described and claimed in my application hereinbefore identified, to which reference may be had for a complete detailed description. Briefly described, it consists of a roll 32 which dips into the cement in the tank, a portion of its periphery projecting through an aperture 33 in the cover plate 23 for the tank. The roll is mounted upon the end of a shaft 34 which passes through the top of the reservoir and which is equipped on its extreme end with a belt-pulley or other power-transmitting device 35. Said shaft 34 is arranged in parallelism with the shaft 29 and is geared thereto through the medium of a gear 36 on said shaft 34 and an idler gear 37 which intermeshes with the gear 30. Coacting with the applying roll to feed the work, there is a roll 38 secured to a shaft 39 journaled at its opposite end in a bearing 40 pivoted in a standard 41 by a pivot or trunnions whose axis is transverse to the axis of rotation of said shaft. On the end of the shaft is a gear 42 loosely intermeshing with the gear 36, the teeth of said gear being sufficiently elongated to permit the shaft 39 to be rocked on its pivot to raise and lower the roll 38 from and toward the roll 33. A bearing block 43 for the shaft 39 is mounted in vertical guides 44 and is pressed downward by a spring 45 against an adjustable stop screw 46.

47 indicates a two-armed lever, one arm of which takes under the block 43, the other arm being connected by a rod 47ª with a treadle not shown.

From the foregoing description it will be seen that I have provided a machine, the base or frame of which constitutes both a reservoir and a tank, from the latter of which the cement is applied to the work, the level of the cement in the tank being regulated by an outlet through, which the surplus cement flows into the reservoir. So long as the machine is in operation, the pump forces the cement in a constant stream from the reservoir through the inlet and inlet duct at a point below the outlet into the tank, in consequence of which the cement in the tank is not permitted to thicken but is kept circulating and is freed from dirt and chips during its circulation and is also kept at a uniform level in the tank.

While I have described the mechanism as being particularly applicable for cementing machines and have used the word "cement" as description of the liquid with which the machine is used, nevertheless the use of the machine is not limited to the application of cement, as it is capable of a variety of other uses. The work, whether it be leather or other material, is passed between the two rolls which coöperate to feed it, the lower roll applying the cement in the manner stated. Various apertures are formed in the reservoir and tank, each being closed by a screw cap. The screw cap 50 closes an aperture in the bottom of the reservoir through which the entire contents of the reservoir may be withdrawn if desired. Screw cap 51 closes an aperture in alinement with the inlet duct 26 through which the conveyer is inserted in assembling the machine. Screw cap 52 closes an aperture through which access may be had, when the tank is empty, to the gate or dam. The base or frame is provided with suitable standards or legs of any convenient shape or design. For removing surplus cement from the grooved applying roll 32, I may employ curved leaf spring scrapers 54 located within and secured to the walls of the tank by bolts 55. The pressure of the ends of the scrapers against the roll may be varied by the adjustment of screws 56 passed through said walls and bearing against said scrapers between the ends thereof.

Having thus explained the nature of my said invention and described a way of making and using the same, although without attempting to set forth all of the forms in which it may be made or all of the modes of its use, what I claim is:

1. A cementing machine, comprising a closed tank for containing a body of cement and having a slotted cover, a cement-applying device dipping into the cement in said tank and applying cement to work exterior to the tank, an outlet from said tank for determining the height of cement in said tank, a reservoir adjacent said tank, into which reservoir said outlet directly opens, the body of cement being at a lower level in said reservoir than in said tank, a rotary pump for forcing cement directly from said reservoir into said tank, an adjustable dam at said outlet for varying the level of the cement in said tank, and means accessible exteriorly of said tank for adjusting said dam.

2. In a cementing machine, a casing forming a reservoir and a tank separated by a wall and connected by an outlet port from said tank and an inlet port to said tank, said ports being formed in said wall, said outlet maintaining the level of the cement in said tank above the level of cement in said reservoir, a rotary pump for forcing cement from said reservoir through said inlet to said tank, and means located on said casing and comprising a cement-applying device dipping into said tank, for applying cement from said tank to the work.

3. In a cementing machine, a casing forming a reservoir and a tank, an outlet from said tank to the reservoir, an inlet from the reservoir to the tank, and entering the tank below the outlet, a pump located in said inlet for forcing the cement from the reservoir into the tank, and a screen in the reservoir for screening the cement flowing back into the reservoir from the tank, said screen being inclined downwardly from said outlet and a roll dipping into the cement in the tank for conveying cement therefrom for its application to the work.

4. In a cementing machine, a box-like bed or frame divided to form a cement-reservoir and a tank, an inlet duct leading from the bottom of the reservoir to the tank, a spiral conveyer in said duct for forcing cement from the reservoir into the tank, an outlet between the tank and the reservoir located to maintain a predetermined height of cement in said tank, the walls of said reservoir converging toward said inlet duct, and means for applying the cement in said tank to the work.

5. A cement-applying machine, comprising a boxlike casing having a partition wall dividing it into a tank and a reservoir for the reception of cement, an outlet in said wall determining the height of cement in the tank, and permitting surplus cement in the tank to return to the reservoir, an inlet duct leading from the reservoir to the bottom of the tank, a screw conveyer in the inlet duct, means for rotating said conveyer, a cement-applying roll dipping into the cement in the tank, and means for closing said tank and reservoir to prevent the evaporation of the cement.

6. A cement-applying machine comprising a boxlike casing having a transverse partition and forming a reservoir and a tank for cement, a cement-applying roll located to receive cement from the tank, a coacting feed roll for pressing the work against the applying roll, an outlet port leading directly from the tank to the reservoir and determining the height of the cement in said tank, an inlet duct from the reservoir to the tank, a screw conveyer in said inlet duct, and gearing for rotating said applying roll, said feed roll and said conveyer.

In testimony whereof I have affixed my signature, in presence of two witnesses.

FRANK A. BRACKETT.

Witnesses:
   FRED L. EMERSON,
   EUGENE N. MCCARTHY.